(12) United States Patent
Parkes et al.

(10) Patent No.: US 10,989,825 B2
(45) Date of Patent: Apr. 27, 2021

(54) METHOD AND SYSTEM FOR DETERMINING SOURCE SIGNATURES AFTER SOURCE GHOST REMOVAL

(71) Applicant: PGS Geophysical AS, Oslo (NO)

(72) Inventors: Gregory Ernest Parkes, Surrey (GB); Stian Hegna, Oslo (NO)

(73) Assignee: PGS Geophysical AS, Oslo (NO)

( * ) Notice: Subject to any disclaimer, the term of this patent is extended or adjusted under 35 U.S.C. 154(b) by 368 days.

(21) Appl. No.: 15/209,554

(22) Filed: Jul. 13, 2016

(65) Prior Publication Data

US 2016/0320510 A1 Nov. 3, 2016

Related U.S. Application Data

(62) Division of application No. 13/367,787, filed on Feb. 7, 2012, now Pat. No. 9,411,062.

(51) Int. Cl.
*G01V 1/38* (2006.01)
*G01V 1/36* (2006.01)

(52) U.S. Cl.
CPC ............ *G01V 1/364* (2013.01); *G01V 1/3808* (2013.01); *G01V 1/3861* (2013.01); *G01V 2210/56* (2013.01)

(58) Field of Classification Search
CPC .... G01V 1/3808; G01V 1/3861; G01V 1/364; G01V 2210/56
See application file for complete search history.

(56) References Cited

U.S. PATENT DOCUMENTS

| | | | | |
|---|---|---|---|---|
| 7,218,572 B2* | 5/2007 | Parkes | .................. | G01V 1/006 367/23 |
| 7,586,810 B2* | 9/2009 | Davies | .................. | G01V 1/368 367/23 |
| 8,958,266 B2* | 2/2015 | Kragh | ................. | G01V 1/3808 367/21 |
| 2004/0136266 A1* | 7/2004 | Howlid | ............... | G01V 1/3808 367/21 |
| 2005/0013194 A1 | 1/2005 | Vaage et al. | | |
| 2005/0259513 A1* | 11/2005 | Parkes | .................. | G01V 1/006 367/23 |
| 2008/0192571 A1 | 8/2008 | Vaage et al. | | |
| 2008/0253227 A1 | 10/2008 | Sollner | | |

(Continued)

FOREIGN PATENT DOCUMENTS

EP 2 249 182 A1 11/2010

OTHER PUBLICATIONS

The Eurasian Patent Office (EAPO), Patent Search Report, dated Jul. 2, 2013.

(Continued)

*Primary Examiner* — Krystine E Breier

(57) ABSTRACT

Seismic data are acquired using a seismic source comprising a plurality of seismic sub-sources disposed in a body of water at a plurality of depths and activated with different time delays. Far-field signatures are determined for the plurality of seismic sub-sources at each of the plurality of depths. A composite ghost-free far-field signature of the seismic source is determined from the far-field signatures for the plurality of seismic sub-sources at each of the plurality of depths and different time delays. A source response is removed from the seismic data using the far-field signatures of the seismic source

16 Claims, 4 Drawing Sheets

(56) References Cited

U.S. PATENT DOCUMENTS

| | | |
|---|---|---|
| 2010/0008184 A1 | 1/2010 | Hegna et al. |
| 2010/0211319 A1 | 8/2010 | van Manen et al. |
| 2012/0072115 A1* | 3/2012 | Laws .................. G01V 1/3861 |
| | | 702/14 |

OTHER PUBLICATIONS

Hegna, Stian et al., "The low frequency output of marine air-gun arrays," SEG San Antonio 2011 Annual Meeting.
Parkes, Greg et al., "A marine seismic acquisition system that provides a full 'ghost-free' solution, " SEG San Antonio 2011 Annual Meeting.
European Search Report, dated Feb. 3, 2015.
Ziolkowski, A., "The signature of an air gun array: Computation from near-field measurements including interactions," Geophysics, vol. 47, No. 10 (Oct. 1982); pp. 1413-1421.
Chinese Search Report, dated May 30, 2016.

\* cited by examiner

METHOD AND SYSTEM FOR DETERMINING SOURCE SIGNATURES AFTER SOURCE GHOST REMOVAL

CROSS-REFERENCE TO RELATED APPLICATION

This application is a divisional of application Ser. No. 13/367,787, filed Feb. 7, 2012.

BACKGROUND

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particular motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times (the activation commonly known as a "shot"). Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and returning from reflective interfaces.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION

Figure 1:
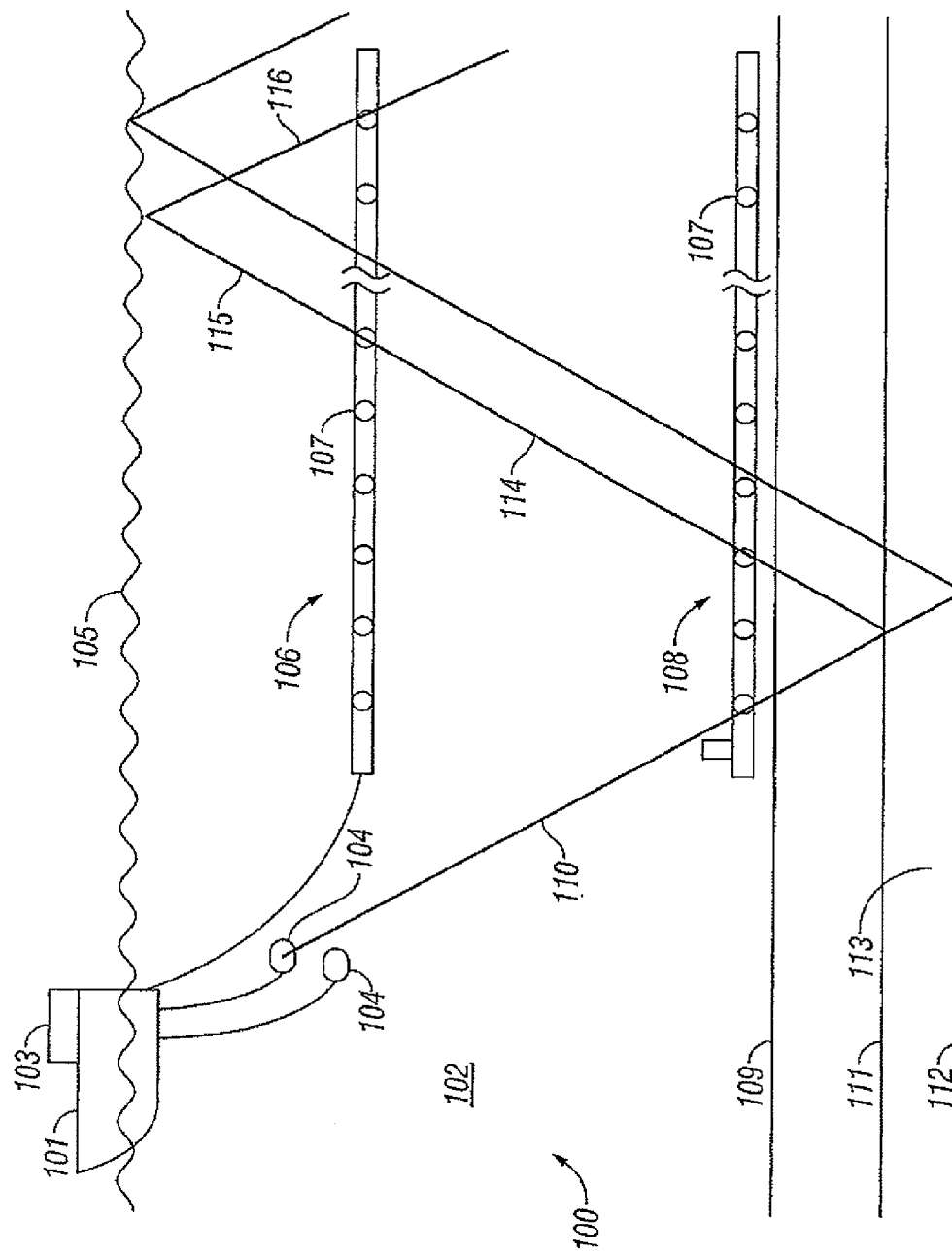
FIG. 1 is a diagram of a system for acquiring seismic data that can be used with seismic data processing methods according to the invention.

FIG. 1 is a diagram of an exemplary system for acquiring seismic data that can be used with seismic data processing methods according to the invention. In various embodiments, a single seismic sensor cable (also called a seismic streamer) or a single ocean bottom cable are shown for simplicity of illustration. This illustration of one cable is only meant to more clearly demonstrate principles of the invention and is not intended as a limitation of the invention.

In FIG. 1, the seismic acquisition system is designated generally as 100. A seismic vessel 101 is disposed in a body of water 102 and carries equipment 103 for navigation, seismic source control, and seismic sensor recording. The seismic vessel 101 or another service vessel (not shown) tows a seismic source 104 through the body of water 102 below the surface 105 of the water. The seismic source 104 comprises any appropriate type of source, typically in arrays. The seismic source 104 illustrated in FIG. 1 comprises a plurality of sub-sources 104, positioned at different depths. Two sub-sources are shown, but the configuration of seismic sub-sources 104 illustrated in the seismic acquisition system 100 is not intended to be a limitation of the invention.

In one embodiment, the seismic vessel 101 or another service vessel (not shown) tows a seismic streamer 106 through the body of water 102. The seismic streamer 106 comprises seismic sensors 107 at spaced apart positions along the seismic streamer 106, so that the seismic streamer 106 containing the seismic sensors 107 is disposed in the body of water 102. The seismic sensors 107 are typically pressure sensors, such as hydrophones. In another embodiment, the seismic streamer 106 comprises a dual-sensor streamer, in which the seismic sensors 107 comprise pairs of collocated pressure and particle motion sensors. The particle motion sensors are typically particle velocity sensors, such as geophones, or accelerometers. The seismic sensors 107 typically comprise arrays of sensors at each spaced apart position. An alternative to having the pressure and particle motion sensors co-located is to have sufficient spatial density of sensors so that the respective wavefields recorded by the pressure and particle motion sensors can be interpolated or extrapolated to produce the two wavefield signals at the same location.

In another embodiment, the seismic vessel 101 or another service vessel (not shown) disposes an ocean bottom cable 108 on the water bottom 109. The ocean bottom cable 108 also comprises seismic sensors 107 at spaced apart positions along the cable, also typically in arrays of sensors at each spaced apart position. The seismic sensors 107 in the ocean bottom sensor 108 can also comprise pairs of pressure and particle motion sensors. In yet another embodiment, both seismic streamers 106 and ocean bottom cable 108 are employed. The type of sensors illustrated in the seismic acquisition system 100 is not intended to be a limitation of the invention. For example, in other embodiments, discrete seismic sensors 107 located at ocean bottom nodes (not shown) could be included in the seismic acquisition system 100.

When the seismic source 104 is activated, acoustic energy travels downwardly, at 110, through the body of water 102 and the water bottom 109 to layer boundaries, such as 111 and 112, surrounding a subterranean formation layer, such as 113. A portion of the acoustic energy is reflected from the layer boundary at 111 and travels upwardly, at 114. The upwardly traveling acoustic energy 114 is detected at seismic sensors 107 on the ocean bottom cable 108 or the seismic streamer 106. The upwardly traveling acoustic energy continues upward, at 115, until reflecting off the water surface 105 and then travels downwardly again, at 116. The downwardly traveling acoustic energy 116 may be detected again by seismic sensors 107 on the seismic streamer 106 or the ocean bottom cable 108, resulting in a ghost signal. The acoustic energy detected at the seismic sensors 107 may be recorded onto any type of appropriate storage media at any location, such as, but not restricted to, at the seismic streamer 106 or the ocean bottom cable 108, on the seismic vessel 101 or another service vessel, or onshore.

As shown above in FIG. 1, marine seismic exploration typically employs a submerged seismic source 104 towed by a ship and periodically activated to generate an acoustic wavefield (the shot). The wavefield may be generated by a small explosive charge, an electric spark or arc, a vibrator, or, typically, a gun. The gun may be a water gun, vapor gun, or, most typically, an airgun. Each airgun contains a volume of air typically compressed to about 2000 psi (pounds per square inch) or more. An airgun abruptly releases its compressed air to create an air bubble, leading to an expanding sound wave in the water. The resulting wave front propagates downwardly into the earth beneath the water, reflects from subterranean earth layers, and returns upwardly toward the water surface.

When a seismic source is triggered, it produces a complex output pressure pulse in the water. In an idealized situation in which the seismic source is a point source, such as a single airgun, and there is no sea surface, the emitted wave front is independent of direction and distance, except for spherical spreading. Converted to an electrical signal, the output pulse of an airgun would consist of a short wave train whose envelope displays an initial short, fast, positive rise in amplitude followed by several rapidly-decaying oscillations. The recorded wave train is called the signature of the seismic source.

In practice, a sea surface exists and is typically only meters away from the seismic source. The acoustic wave generated by the seismic source radiates by spherical spreading in all directions such that there is a downwardly traveling component as well as an upwardly traveling component. The water-air interface at the sea surface has a reflection coefficient typically close to a value of −1. The upwardly traveling component of the acoustic wave is reflected by the water surface and is reversed in polarity to become another downgoing component. This additional downgoing component is generally referred to as a "ghost". The ghost interferes with the direct wave to complicate the source signature.

Typically, a seismic source consists not of a single source element, but of a spatially-distributed array of source elements that generate direct arrivals plus the ghost components. This is particularly true of airguns, currently the most common form of marine seismic source. The spatial dimensions of an array of seismic source elements may be comparable to the wavelengths of the acoustic waves themselves within the useful seismic frequency passband. Thus, there is no single source signature for an array. Rather, the source signature of an array in the near-field becomes a continuous function of both direction and distance. At distances large compared with the array dimensions, the dependence on distance of the source signature in any particular direction becomes negligible. This region is called the far-field and the source signature here is called the far-field signature. In particular, the far-field signature is the wavelet traveling vertically downwards from the source array, including the sea surface ghost reflection (source and receiver ghosts), and at a large enough distance that the shape of the wavelet is substantially invariant with increasing distance. For arrays of airguns, which typically extend over spatial dimensions of about 20 meters by 20 meters, the distance to the far-field is on the order of 250 meters.

In reality, the source signature at a distance does vary with take-off angle from the seismic source. Nonetheless, the far-field signature defined above is representative of the source response in conventional seismic data to a first-order approximation. This vertical far-field signature is useful for seismic data processing in order to sharpen the wavelet and correct the phase response, normally to zero- or minimum-phase. In particular, this far-field signature is used for deconvolving the source response. Alternatively, a more complex directional deconvolution of the source response could be used. For example, source signatures at different emission angles can be calculated by summing notional source signatures with appropriate time shifts. One method for calculating the notional source signatures is to use near-field measurements from the seismic source array. Typically, there is one near-field hydrophone per source element. The measurable signature $p_j(t)$ at the $j^{th}$ hydrophone is given by:

$$p_j(t) = \sum_{i=1}^{n} \left(\frac{1}{r_{ij} - tv_{ij}}\right) p'_i(t_{ij}), \text{ for } j = 1, 2, \ldots, n. \quad (1)$$

Here, $r_{ij}$ is the distance between the $i^{th}$ seismic source-generated air bubble and the $j^{th}$ hydrophone, $v_{ij}$ is a closing relative velocity between the $i^{th}$ bubble and the $j^{th}$ hydrophone, $p'_i$ is a weighted unknown signature, and $t_{ij}$ is given by:

$$t_{ij} = t - \frac{r_{ij} - 1}{c}. \quad (2)$$

Other methods exist in the prior art for determining the far-field source signature, $s_{ng}(t)$, so that it can be removed from the seismic wavelet, w(t).

The notional source method is first described in Ziolkowski, A., Parkes, G., Hatton, L., and Haugland, T., "The signature of an airgun array: Computation from near-field measurements including interactions", *Geophysics*, Vol. 47, No. 10 (October 1982), pp. 1413-1421. The calculation of far-field signatures normally includes the source ghost, and possibly also the receiver ghost, since these ghosts are an intrinsic part of the seismic wavelet that appears in the seismic data. A notional source signature is a signature that describes the wavefield emitted by a single source element (gun or cluster) of an array of marine seismic sources. The notional source signature cannot be measured directly because any hydrophone placed near any particular source element will also record contributions from the wavefields of all the surrounding source elements along with their ghosts. However, the notional source can be derived from a suitable grid of hydrophone measurements.

The far-field signature, or its equivalent, can be determined by a number of other methods also. For example, in a second exemplary embodiment, the vertically travelling far-field signature is directly measured with a far-field hydrophone. This method requires positioning the sensor (hydrophone) the required distance from the seismic source. The far-field method often requires moving the seismic survey vessels and equipment to deeper waters to make the far-field measurements. In a third exemplary embodiment, the far-field signature can be modeled from available data. This description of several methods is not intended to limit the invention.

In one embodiment associated with the invention, the seismic source comprises a plurality of seismic sub-sources disposed in a body of water at a plurality of different depths and activated with different relative time delays. In this embodiment, the source response deconvolution handles the source ghost separately. Thus, a ghost-free far-field signature is required. This signature is equivalent to combining a plurality of ghost-free far-field signatures into a composite ghost-free far-field signature. This result is accomplished in this embodiment by applying de-ghosting equations to the plurality of far-field signatures for the plurality of sub-sources. This de-ghosting effectively synchronizes and merges the seismic data from the individual sub-sources into a composite of ghost-free far-field signatures of the sub-sources, merged by processing through the de-ghosting equations. The result is the composite ghost-free far-field signature of the seismic source that is used in this embodiment to deconvolve the source response.

A seismic source configuration can be employed in which multiple sub-sources within a seismic source are deployed at different depths. The two-depth arrangement is known as an "over/under" configuration. The source ghost may be removed, in one example embodiment, using the method described in Posthumus, B. [1993], "Deghosting of twin streamer configuration", *Geophysical Prospecting*, vol. 41, pp. 267-286. The Posthumus method was originally described for over/under streamers, but it is equally applicable to over/under sources.

Using the Posthumus method, the wave field W($\omega$) without the source ghost can be calculated by the following equation in the frequency domain:

$$W(\omega) = \frac{O_1(\omega)G_1(\omega)* + O_2(\omega)G_2(\omega)*}{|G_1(\omega)|^2 + |G_2(\omega)|^2}. \quad (3)$$

Here $O_1(\omega)$ is the recorded signal corrected for the actual actuation time of the first set of sub-sources at one depth with respect to initiation of recording (time t=0) in the shot record, $O_2(\omega)$ is the recorded signal corrected for the actual actuation time of the second set of sub-sources at another depth with respect to initiation of recording (time t=0) in the shot source and compensating for its being closer to the reflectors than the first set of sub-sources, $G_1(\omega)$ is the source ghost for the first set of sub-sources, $G_2(\omega)$ is the source ghost for the second set of sub-sources, and a superscript asterisk "*" designates conjugation.

In this example embodiment, the source ghost operator, $g_1(t)$, for the first set of seismic sub-sources may be defined in the time domain as follows:

$$g_1(t) = \delta(t) - \delta\left(t - 2d_1 \frac{\cos(\alpha)}{c}\right), \quad (4)$$

and similarly, the source ghost operator, $g_2(t)$, for the second set of seismic sub-sources may be defined as $$g_2(t) = \delta(t) - \delta\left(t - 2d_2 \frac{\cos(\alpha)}{c}\right). \quad (5)$$

Here, $d_1$ is the operating depth of the first set of sub-sources; $d_2$ is the operating depth of the second set of sub-sources; $\alpha$ is the emission angle of the energy propagation from the source, relative to vertical; and $\delta$ is the Dirac delta operator.

The invention, however, is not limited to just two depths. In the more general case, the seismic sources comprise a plurality of sets of sub-sources at a plurality of different depths. Let there be N sets of sub-sources, with each set comprising seismic sub-sources at the same depth. Then, the wavefield W($\omega$) without the source ghost can be calculated by the following in the frequency domain:

$$W(\omega) = \frac{\sum_{i=1}^{N} O_i(\omega)G_i(\omega)*}{\sum_{i=1}^{N} |G_i(\omega)|^2}. \quad (6)$$

Here, now, $O_i(\omega)$ is the recorded signal corrected for the actuation time of the $i^{th}$ set of sub-sources at the $i^{th}$ depth and $G_i(\omega)$ is the source ghost for the $i^{th}$ set of sub-sources. Then the source ghost operator, $g_i(t)$, for the $i^{th}$ set of seismic sources may be defined in the time domain as follows:

$$g_i(t) = \delta(t) - \delta\left(i - 2d_i \frac{\cos(\alpha)}{c}\right), \quad (7)$$

for i=1, 2, ..., N, where $d_i$ is the operating depth of the $i^{th}$ set of sources.

If the Posthumus method is applied to seismic data acquired with source arrays or sub-source arrays at different depths, then the source ghost is removed. In addition, the seismic wavelet itself undergoes a transformation, as the wavefields from the sub-sources at the different depths undergo a frequency-dependent weighted summation. Therefore, the conventional far-field signature (as described above) can no longer be used in the signature deconvolution. Instead, it is necessary to determine the transformed source signature after combining the wavefields from a plurality of sub-sources at different depths and removing the source ghost.

An embodiment associated with the invention accomplishes this determination by determining the far-field signatures of each source or each source component of a source array towed at different depths. Each of these far-field signatures should include the source and receiver ghosts. These far-field signatures may be determined using any of the methods already known in the art, and should include the response of the receiver system. These far-field signatures are then input to the same algorithm that is used for removing the source ghost in the seismic data itself. The resulting composite ghost-free far-field signature is representative of the signature in the recorded seismic data after source ghost removal, and can be used for designing a de-signature filter to correct for the phase- and/or amplitude-spectrum of the signature. The resulting far-field signature according to this embodiment is required for proper over/under source de-signature.

The object of the employing a seismic acquisition system 100, as in FIG. 1, is to map the earth's geology using the seismic data, d(t), recorded during the seismic survey. The ideal end product would be the pure impulse response of the earth, which can be expressed as the reflectivity series of the earth, $e_{rs}(t)$. In reality, conventional recorded seismic data comprises a convolution of the reflectivity series of the earth, $e_{rs}(t)$, with a seismic wavelet, w(t), plus noise, n(t):

$$d(t) = e_{rs}(t) * w(t) + n(t), \quad (8)$$

where t is time and an asterisk "*" designates convolution.

Three major terms in this seismic wavelet are the source response itself, the source ghost, and the receiver ghost. Although this seismic wavelet is actually a function of direction, it is often approximated by the vertically traveling far-field signature.

The seismic wavelet, w(t), comprises a combination of the various responses of the earth itself, the source, receiver and surface reflections or ghosts. Once the seismic wavelet, w(t), and the noise, n(t), are determined, they can then be removed from the recorded seismic data, d(t). The final result is a reflectivity series of the earth, $e_{rs}(t)$, that very closely represents the ideal impulse response of the earth.

In one embodiment, the seismic wavelet, $w(t)=w(t,x,y,z,\theta,\varphi)$, can be expressed as a convolution of operators (functions that determine the signatures) representing the receiver ghost, $g_r(t)=g_r(t,\theta,\varphi)$, the source ghost, $g_s(t)=g_s(t,\theta,\varphi)$, the ghost-free source system response, $s_{ng}(t)=s_{ng}(t,\theta,\varphi)$, the earth filter response, $e(t)=e(t,\theta,\varphi)$, and the receiver system response, $r(t)=r(t,\theta,\varphi)$. Here, t is time, $\theta$ and $\varphi$ are emission angles, and x, y, and z are Cartesian spatial coordinates. For simplicity of illustration, the operators will be expressed in the time domain. Thus, in this embodiment, the recorded seismic wavelet is described as follows:

$$w(t) = g_r(t) * g_s(t) * s_{ng}(t) * e(t) * r(t). \quad (9)$$

The earth filter response, e(t), represents the frequency-dependent attenuation as the acoustic wavefield propagates through the earth.

In one embodiment, the invention is a method and a system for properly determining a far-field source signature for a seismic acquisition system employing sources or source components at different depths and activated with different relative time delays.

First, the far-field source signatures of the seismic sub-sources can be determined based on methods described above. For example, in one exemplary embodiment, the so-called notional source signatures can be calculated either from measured data in the field or from simulated responses calibrated to field measurements. Such calculations are based on the notional source method as described above. The calculations of the notional source signatures need to take the interaction effects of the source ghost into account. However, when calculating the far-field signatures from the notional source signatures, the source ghost, $g_s(t)$, is not included in the calculations. To derive the far-field signatures for a source array in which a plurality of sub-sources are distributed at different depths, the far-field signatures for each seismic sub-source need to be summed through a weighted summation method similar to that used for removing the source ghost in the measured data. The resultant composite ghost-free source signature can then be used as a basis for removing the response of the source.

By using a seismic acquisition system employing source arrays in which the sub-sources are distributed in depth, the source ghost can be removed through a weighted summation of the sub-sources distributed in depth. One example of such a source is an "over/under source." For example, in one exemplary embodiment, the Posthumus method described above can be used for over/under sources (instead of streamers, as described in the article).

In another example embodiment, the seismic data from one set of sub-sources is first time shifted so that the source ghost occurs at the same time as on the other set of sub-sources. Next, the two set of seismic data from the two sets of sub-sources are subtracted, which removes the source ghost. The result of the subtraction will contain an apparent ghost with a relative amplitude of −1 and a known time delay of twice the vertical traveltime of the distance between the depths of the two sets of sub-sources. Thus, a deterministic deghosting filter can be constructed and applied to compensate for the predictable amplitude and phase effects.

In yet another example embodiment, the seismic data from two sets of sub-sources at different depths are first filtered with deterministic filters designed to correct only for the phase effects of the source ghost. Next, the filtered data from one set of sub-sources are time-shifted so that events occur at the same time in the two filtered data sets. Then the two data sets are summed to fill in the notches in the amplitude spectra.

In yet another example embodiment, the two seismic data sets from the two sets of sub-sources are both summed and subtracted from each other, yielding sum and difference data sets, respectively. Next the difference data set is integrated and scaled by ¼ times the inverse of times half the traveltime between the different depths for the two sets of sub-arrays. Next, the sum data set is scaled by ¼. Then, the scaled integrated difference data set is subtracted from the scaled sum data set to yield the up-going wavefield.

Hence, the effects of the source ghost, $g_s(t)$, can be removed from each of the far-field signatures in the wavelet, w(t). Other methods exist in the prior art for determining and removing the effects of the source ghost, $g_s(t)$, from the seismic wavelet, w(t). This description of several exemplary methods is not intended to limit the invention.

With a dual-sensor or multi-component towed streamer comprising both pressure sensors and motion sensors, the up-going and down-going wavefields can be separated through scaled or weighted summation of the measured components. For example, in one exemplary embodiment, the up-going and down-going pressure wavefields, $P_u$ and $P_d$, respectively, can be calculated from the measured pressure wavefield P and vertical velocity wavefield component $V_z$ and expressed in the frequency domain as follows:

$$g_i(t) = \delta(t) - \delta\left(i - 2d_i \frac{\cos(\alpha)}{c}\right),\quad(10)$$

and $$P_u(\omega) = \frac{1}{2}\left[P(\omega) + \frac{\rho\omega}{k_z}V_z(\omega)\right],\quad(11)$$

where ω is rotational frequency, ρ is water density, and $k_z$ is vertical wavenumber, given by:

$$k_z = \sqrt{\left(\frac{\omega}{c}\right)^2 - k_x^2 - k_y^2},\quad(12)$$

where c is speed of sound in water and $k_x$ and $k_y$ are the horizontal wavenumbers in the x (typically inline) and y (typically cross-line) directions, respectively.

Since the up-going pressure wavefield, $P_u$, contains no down-going reflections, the receiver ghost is not present in $P_u$. Hence, the effects of the receiver ghost, $g_r(t)$, can be removed from the wavelet, $w_1(t)$, as expressed in Equation (1). At this stage, the following seismic wavelet, $w_2(t)$, is left:

$$w_2(t) = g_s(t) * s_{ng}(t) * e(t) * r(t).\quad(13)$$

Other methods exist in the prior art for determining and removing the effects of the receiver ghost, $g_r(t)$, from the seismic wavelet, w(t). This description of one method is not intended to limit the invention. For example, in another exemplary embodiment, the receiver ghost, $g_r(t)$, is removed using a specially designed receiver system.

Figure 2:
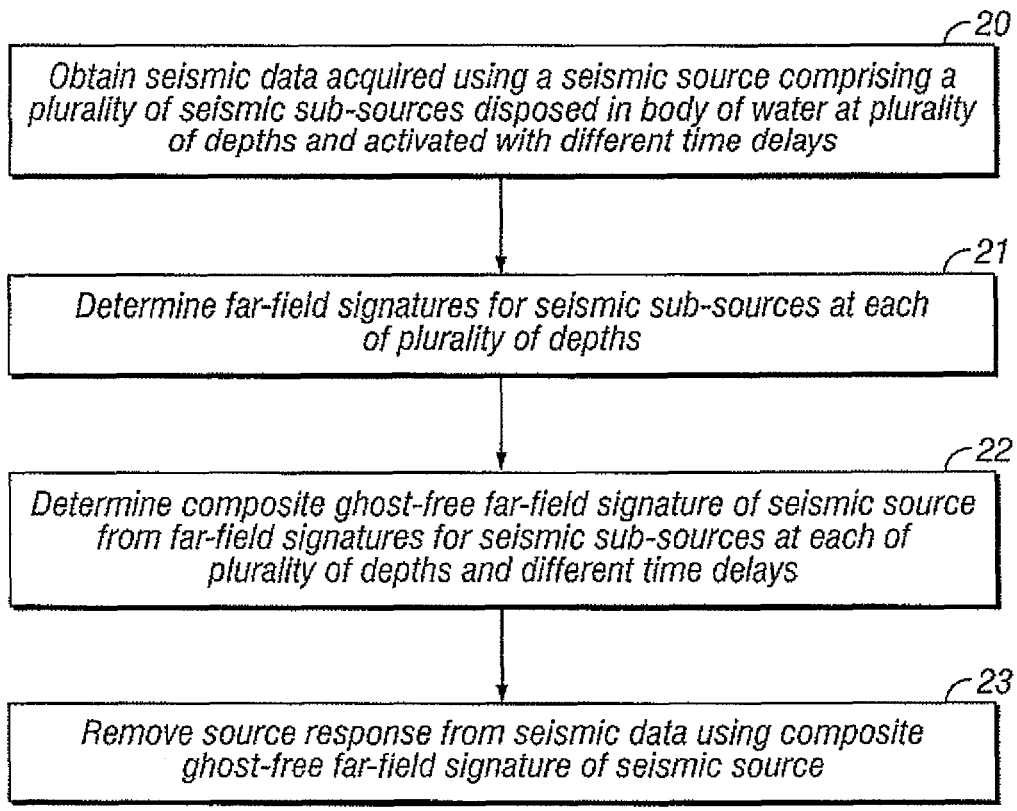
FIG. 2 is a flowchart illustrating an example embodiment of a method for mapping the earth's geology.

FIG. 2 is a flowchart illustrating an example embodiment of a method for mapping the earth's geology.

At block 20, seismic data are obtained that are acquired using a seismic source comprising a plurality of seismic sub-sources disposed in a body of water at a plurality of depths and activated with different relative time delays. Obtaining the seismic data can include acquiring data, such as by a marine seismic survey, or retrieving previously acquired data from storage, such as from computer memory or other types of memory storage devices or media.

At block 21, far-field signatures are determined for the plurality of seismic sub-sources in block 20 at each of the plurality of depths.

At block 22, a composite ghost-free far-field signature of the seismic source is determined from the far-field signatures from block 21 for the plurality of seismic sub-sources at each of the plurality of depths and different time delays.

At block 23, a source response is removed from the seismic data from block 20 using the composite ghost-free far-field signature from block 22 of the seismic source.

Figure 3:
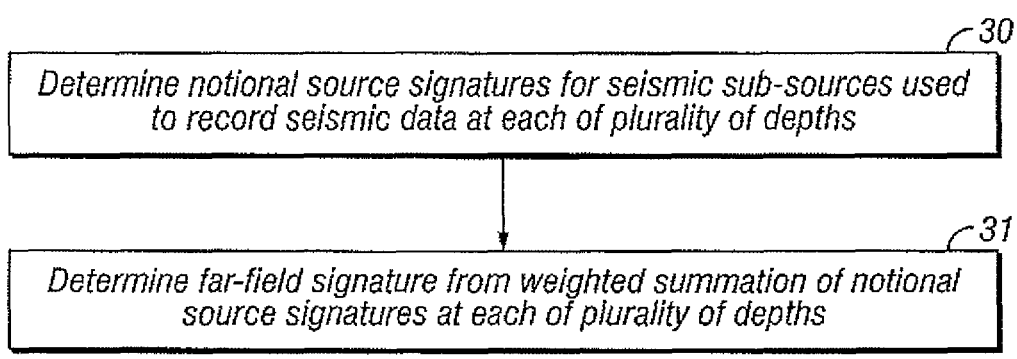
FIG. 3 is a flowchart illustrating an example embodiment of a method for determining the far-field signatures.

FIG. 3 is a flowchart illustrating an example embodiment of a method for determining the far-field signatures. FIG. 3 further describes a portion of the method in FIG. 2.

At block 30, notional source signatures are determined for the plurality of seismic sub-sources used to record the seismic data at each of the plurality of depths; and At block 31, a far-field signature is determined from a weighted summation of the notional source signatures for the plurality of seismic sub-sources at each of a plurality of depths from block 30.

Figure 4:
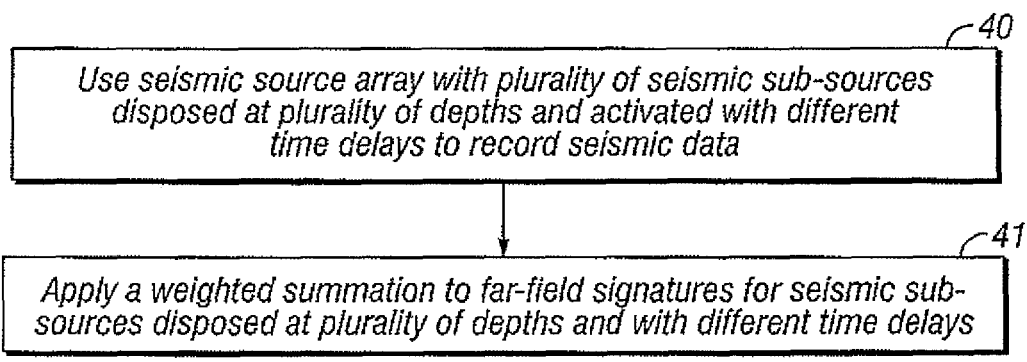
FIG. 4 is a flowchart illustrating an example embodiment of a method for removing the source response from the seismic data.

FIG. 4 is a flowchart illustrating an example embodiment of a method for removing the source response from the seismic data. FIG. 4 further describes a portion of the method in FIG. 2.

At block 40, a seismic source array with a plurality of seismic sub-sources disposed at a plurality of depths and activated with different relative time delays is used to record the seismic data.

At block 41, a weighted summation is applied to the far-field signatures from block 21 of FIG. 2 for the plurality of seismic sub-sources disposed at the plurality of depths and with different time delays from block 40.

Figure 5:
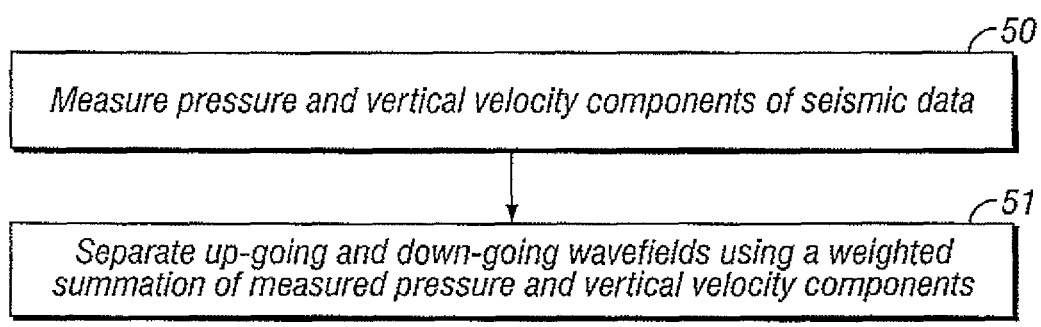
FIG. 5 is a flowchart illustrating an example embodiment of a method for removing the receiver ghost from the seismic data.

FIG. 5 is a flowchart illustrating an example embodiment of a method for removing the receiver ghost from the seismic data. FIG. 5 further describes a portion of the method in FIG. 2.

At block 50, pressure and vertical velocity components of the seismic data are measured.

At block 51, up-going and down-going wavefields are separated using a weighted summation of the measured pressure and vertical velocity components from block 50.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time. A prerequisite for discovery of any oil or gas reservoir is a well-resolved seismic image of the earth's subsurface.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

Figure 6:
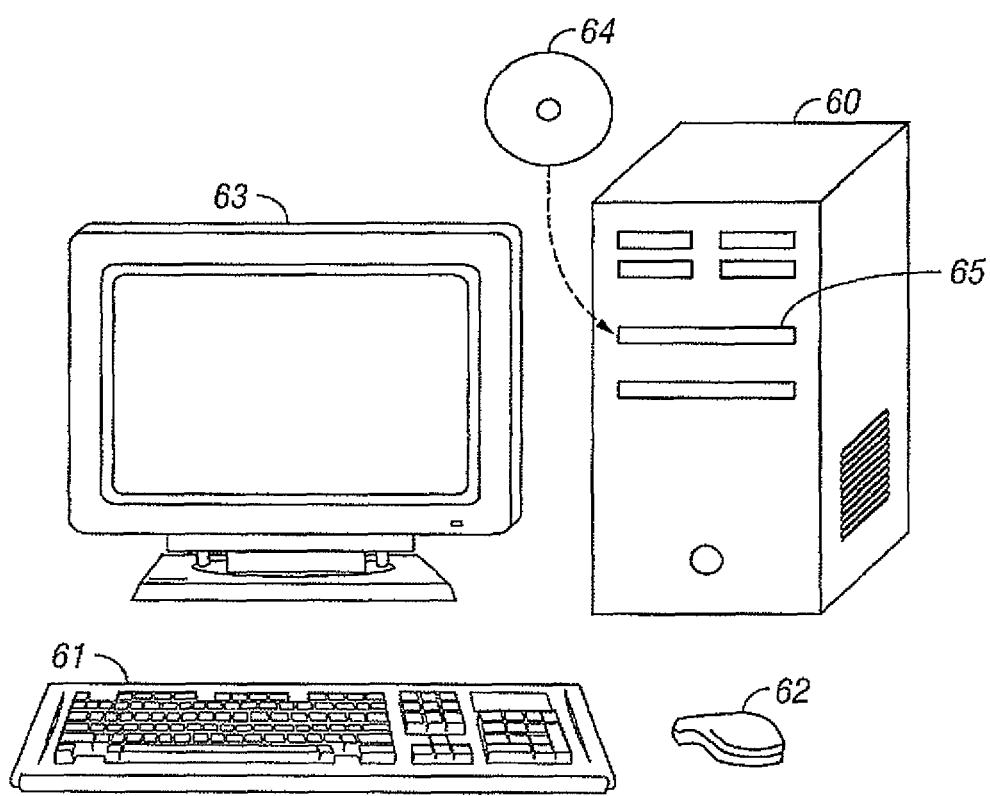
FIG. 6 is a diagram illustrating, by way of example, one of many different types of computer systems that can be used with seismic data processing methods according to the invention.

FIG. 6 is a diagram illustrating, by way of example, one of many different types of computer systems that can be used with seismic data processing methods according to the invention. A central processor 60 is coupled to user input devices, such as a keyboard 61 (wired or wireless) and a mouse 62 (wired or wireless). The processor 60 is further coupled to a display, such as a monitor 63. A computer program according to the invention may reside on any of a number of computer readable media, such as a disk 64 insertable into a disk drive 65 or on an internal or external hard drive (not shown).

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

The invention claimed is:

1. A system for mapping the earth's geology, comprising:
   a seismic source comprising a plurality of seismic sub-sources disposed in a body of water at a plurality of depths and activated with different time delays,
   seismic sensors disposed in the body of water to detect seismic energy reflected from the earth's subsurface in response to seismic signals generated by the seismic source and record the seismic energy as seismic data in a memory storage device; and
   a programmable computer used to perform at least the following:
      determining far-field signatures for the plurality of seismic sub-sources at each of the plurality of depths;
      determining a composite ghost-free far-field signature of the seismic source from the far-field signatures for the plurality of seismic sub-sources at each of the plurality of depths and different time delays; and
      removing a source response from the seismic data using the composite ghost-free far-field signature of the seismic source.

2. The system of claim 1, wherein the determining far-field signatures for the plurality of seismic sub-sources at each of the plurality of depths comprises:
   determining notional source signatures for the plurality of seismic sub-sources at each of the plurality of depths; and
   determining a far-field signature from a weighted summation of the notional source signatures.

3. The system of claim 1, wherein the determining far-field signatures for the plurality of seismic sub-sources at each of the plurality of depths comprises:
   measuring the far-field signatures for the plurality of seismic sub-sources at each of the plurality of depths.

4. The system of claim 1, wherein the determining far-field signatures for the plurality of seismic sub-sources at each of the plurality of depths comprises:
   modeling the far-field signatures for the plurality of seismic sub-sources at each of the plurality of depths.

5. The system of claim 1, wherein determining the composite ghost-free far field signature of the seismic source from the far-field signatures for the plurality of seismic sub-sources at each of the plurality of depths and different time delays comprises:
   applying a weighted summation to the far-field signatures for the plurality of seismic subsources at each of the plurality of depths and different time delays.

6. The system of claim 1, wherein the removing the source response from the seismic data further comprises: removing a receiver ghost from the seismic data.

7. The system of claim 6, wherein the removing the receiver ghost from the seismic data comprises:
   measuring pressure and vertical velocity components of the seismic data; and
   separating up-going and down-going wavefields using a weighted summation of
      the measured pressure and vertical velocity components, wherein the down-going wavefields are the receiver ghost.

8. At least one computer readable medium with a computer program stored thereon, the program having logic operable to cause at least one programmable computer to perform a method comprising:
   obtaining seismic data that are acquired using seismic sub-sources disposed in a body of water at a plurality of depths and activated with different time delays;
   determining far-field signatures for the plurality of seismic sub-sources at each of the plurality of depths;
   determining a composite ghost-free far-field signature of the seismic source from the far-field signatures for the plurality of seismic sub-sources at each of the plurality of depths and different time delays; and
   removing a source response from the seismic data using the far-field signatures of the seismic source.

9. The medium of claim 8, wherein the determining far-field signatures for the plurality of seismic sub-sources at each of the plurality of depths comprises:

determining notional source signatures for the plurality of seismic sub-sources at each of the plurality of depths; and determining a far-field signature from a weighted summation of the notional source signatures.

10. The medium of claim 8, wherein the determining far-field signatures for the plurality of seismic sub-sources at each of the plurality of depths comprises:

measuring the far-field signatures for the plurality of sub-seismic sources at each of the plurality of depths.

11. The medium of claim 8, wherein the determining far-field signatures for the plurality of seismic sub-sources at each of the plurality of depths comprises:

modeling the far-field signatures for the plurality of seismic sub-sources at each of the plurality of depths.

12. The medium of claim 8, wherein the determining the composite ghost-free far-field signature of the seismic source from the far-field signatures for the plurality of seismic sub-sources at each of the plurality of depths and different time delays comprises:

applying a weighted summation to the far-field signatures for the plurality of seismic sub-sources at each of the plurality of depths and different time delays.

13. The medium of claim 8 further comprising removing a receiver ghost from the seismic data.

14. The medium of claim 13, wherein the removing the receiver ghost from the seismic data comprises:

measuring pressure and vertical velocity components of the seismic data; and separating up-going and down-going wavefields using a weighted summation of the measured pressure and vertical velocity components.

15. The system of claim 1, wherein removing the source response from the seismic data using the composite ghost-free far-field signature of the seismic source comprises deconvolving the composite ghost-free far-field signature from the seismic data.

16. The medium of claim 8, wherein removing the source response from the seismic data using the composite ghost-free far-field signature of the seismic source comprises deconvolving the composite ghost-free far-field signature from the seismic data.

\* \* \* \* \*